Figure 1:
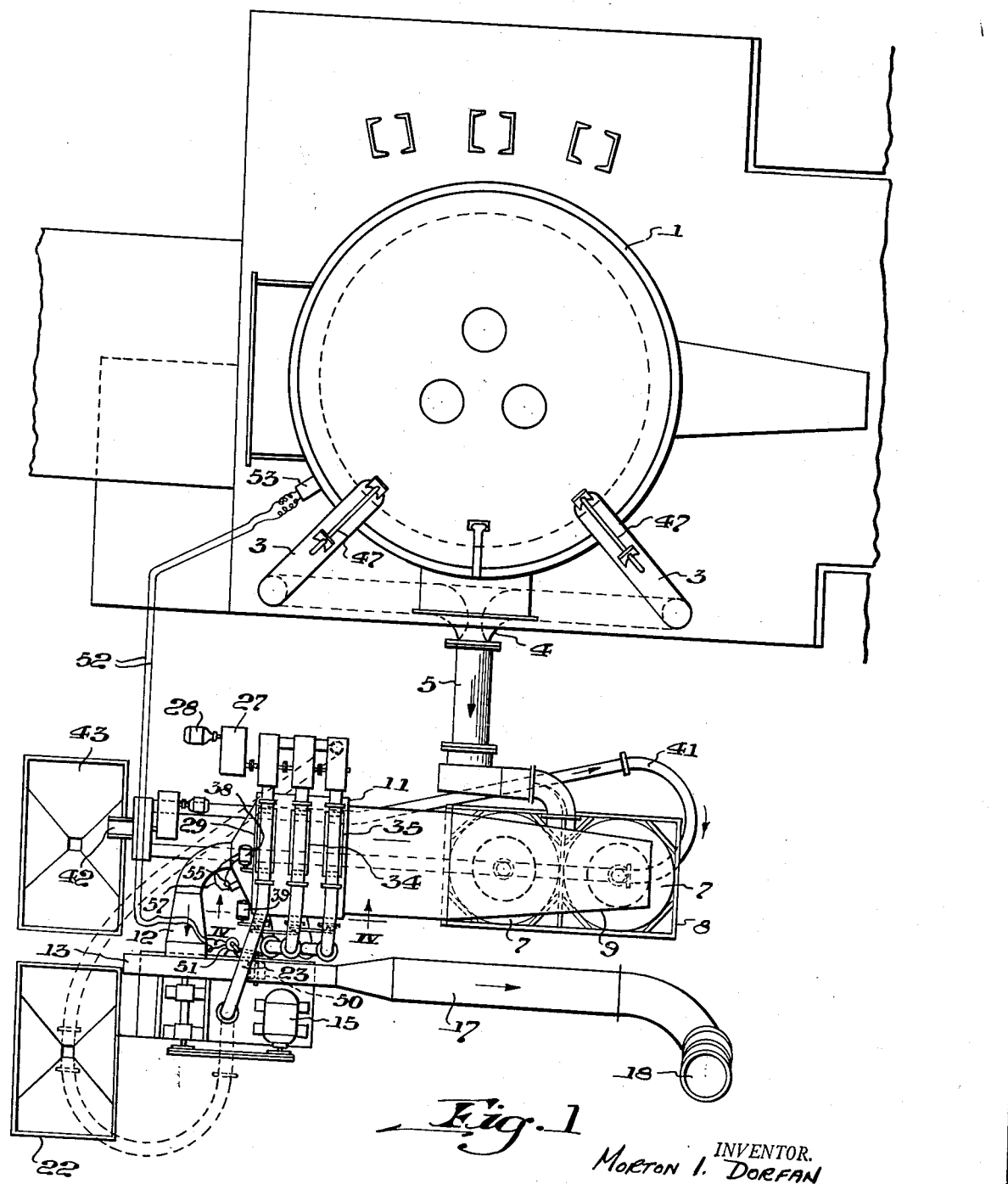

June 8, 1954

M. I. DORFAN 2,680,493

APPARATUS FOR REMOVING FUME FROM ELECTRIC FURNACE GASES

Filed Nov. 1, 1951

3 Sheets-Sheet 1

INVENTOR.
MORTON I. DORFAN
BY
Brown, Critchlow, Flick & Peckham
ATTORNEYS.

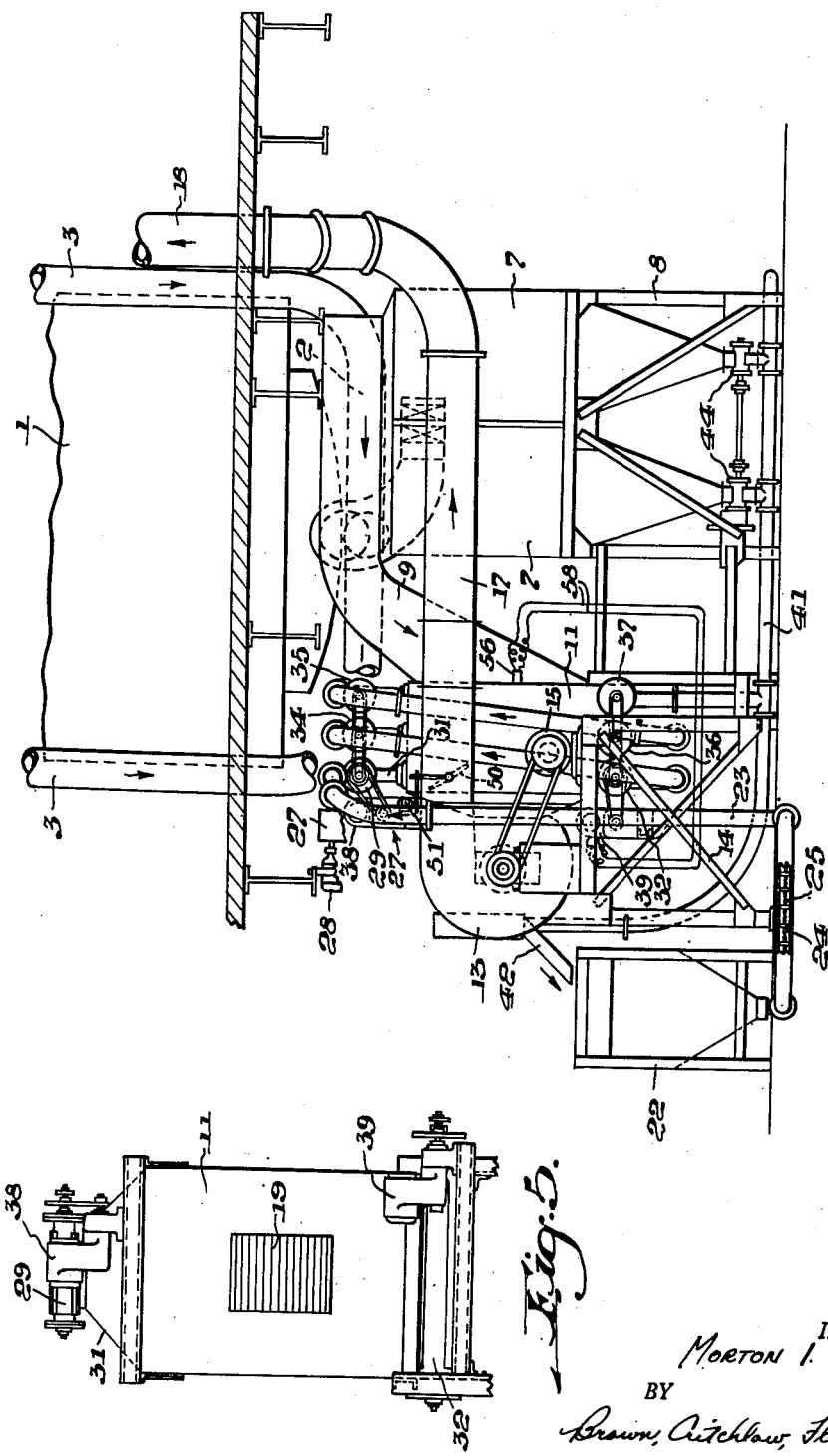

June 8, 1954
M. I. DORFAN
2,680,493
APPARATUS FOR REMOVING FUME FROM ELECTRIC FURNACE GASES
Filed Nov. 1, 1951
3 Sheets-Sheet 3
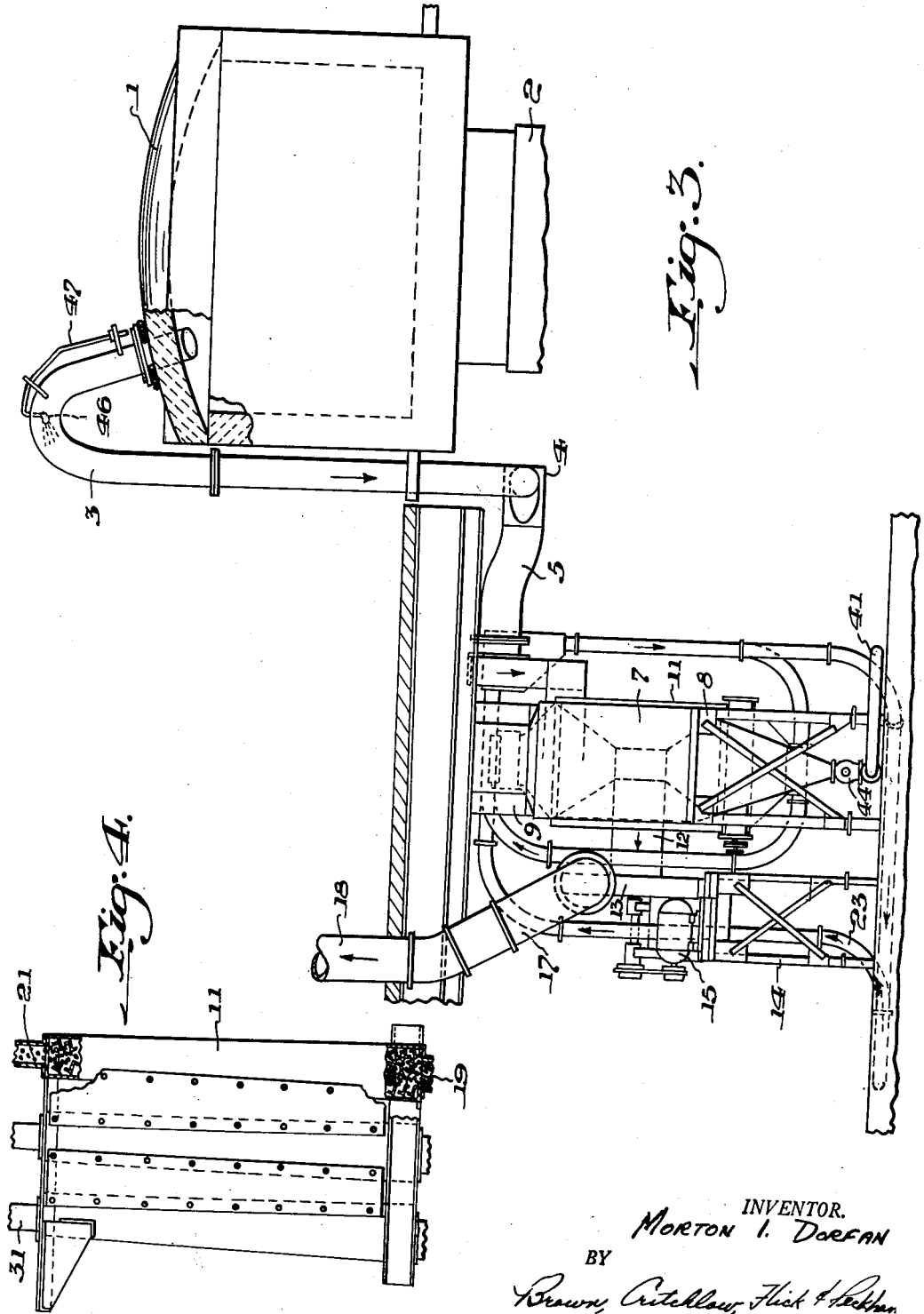
INVENTOR.
Morton I. Dorfan
BY
Brown, Critchlow, Flick & Peckham
ATTORNEYS.

Patented June 8, 1954

2,680,493

UNITED STATES PATENT OFFICE 2,680,493

APPARATUS FOR REMOVING FUME FROM ELECTRIC FURNACE GASES

Morton I. Dorfan, Pittsburgh, Pa., assignor to Mechanical Industries, Inc., Pittsburgh, Pa., a corporation of Pennsylvania Application November 1, 1951, Serial No. 254,392

11 Claims. (Cl. 183—16)

This invention relates to apparatus for removing fume from gases produced in an electric melting furnace.

In the melting of steel and the like in electric furnaces, highly objectionable and even dangerous gases are given off in considerable quantity. These gases not only are noxious, but they also create a great nuisance in the neighborhood. Furthermore, they contain a great quantity of particles from the charge being melted in the furnace, which are thereby lost.

Attempts have been made to control the disposition of such gases by hooding the furnaces, but hooding an electric furnace makes encumbrances that obscure the furnace and make it difficult to see the furnace roof, wherefore burnthroughs are apt to go undetected. The hoods also interfere with top charging and operation of electric furnaces, making it difficult to adjust electrodes and shortening their movement. The hoods are expensive to maintain, due to the high temperature of the gases. Furthermore, there still remains the problem of disposing of the gases after they have been conducted away by the hoods. Since the fume particles are extremely fine, being mainly submicron size, the common type of dust collectors are ineffective.

It is among the objects of this invention to provide apparatus for disposing of electric furnace gases, which removes fume from such gases continuously, which collects the fume so that it can be used in charging the furnace, which is designed to use as the fume-filtering material a product of such a furnace so that the material can be used as part of the furnace charge after it has served as a filter, which reduces the temperature and volume of gases handled immediately after they leave the furnace, which permits a slightly negative pressure to be maintained in the furnace, and which continuously renews the filter beds.

In accordance with this invention, the gases produced in an electric melting furnace are conducted in a general horizontal direction through a filter housing provided with a plurality of laterally spaced substantially vertical chambers having perforated side walls extending across the path of the gases. Means is provided for delivering filtering material to the top of the chamber farthest from the furnace to form a downwardly moving filter bed in it. Further means are provided for feeding the filtering material to the top of each succeeding chamber from the bottom of the preceding chamber. Dirty filtering material is released from the bottom of the chamber nearest the furnace and is carried away to be used in the furnace charge. Preferably, the filtering material consists of chips of metal of the same composition as that poured from the furnace. For example, when steel is being melted in a furnace the chips are the machinings from products made from the furnace steel. Before the gases are filtered they preferably are passed through a cyclone separator, and before that they are cooled by water to reduce their temperature and volume. Means are provided for controlling the flow of gases from the furnace and also the rate of flow of filter material through the different beds. In this way the pressure within the furnace is controlled, as well as the pressure drop across the filters.

The preferred embodiment of the invention is illustrated in the accompanying drawings, in which Fig. 1 is a plan view; Fig. 2 is an elevation; Fig. 3 is an end view; Fig. 4 is an enlarged vertical section of the filter taken on the line IV—IV of Fig. 1; and Fig. 5 is an enlarged view of the exit end of the filter housing.

Referring to the drawings, a typical electric furnace 1 is shown mounted on a suitable support 2, on which the furnace can be rocked to pour it. In a suitable location, such as its roof, the furnace is provided with a pair of openings, through which flexible conduits 3 extend. The conduits extend upward above the furnace and then curve down beside it with their lower portions extending inward toward each other to a T 4, from which a single larger conduit 5 extends outward away from below the furnace. This last conduit delivers furnace gases into the sides of a pair of cyclone separators 7 of conventional form mounted on a framework 8. The outlets of the separators are at their upper ends and are connected to the bottom of a common duct 9 that extends across the top of the separators and then downward beside them. The outlet of this duct is in a vertical plane and is large and rectangular. It connects to the inlet of a rectangular filter housing 11, the opposite end of which is connected by a duct 12 to an exhaust fan 13 mounted on a framework 14 that also supports the motor 15 that drives the fan. The outlet of the fan is connected to a conduit 17 that leads to a stack 18 which delivers the furnace gases to the atmosphere.

As shown in Fig. 4, the inside of the filter housing is divided by transverse partitions into a plurality of chambers, alternate ones of which are tapered upward slightly to form filter cells.

The cells are substantially vertical, by which is meant that even if they are inclined they are upright enough to permit filtering material to flow down through them by gravity. Those shown are perfectly upright. Each cell partition is formed from vertically spaced overlapping louvers in the form of Z bars 19 that extend across the housing 11 in each cell. The furnace gases can flow between the bars in each partition, but the filtering material in the cells cannot escape through the partitions because the lower inner edge of each bar is slightly lower than the upper edge of the next bar below it.

For most economical operation the filtering material 21 in the cells should be composed of the metal chips machined from articles that are produced from the metal poured from the furnace. For example, if steel is being melted in the furnace, steel chips are used as the filtering material. These chips are collected in the machine shop and dumped into a bin 22, beneath the outlet of which a conveyor extends. Although the exact kind of conveyor used forms no part of this invention, it is preferred to use a Hapman conveyor, which consists of a continuous metal tube 23 through which longitudinally spaced discs 24 are drawn by an endless chain 25. The chain is driven by a driving unit 27 operated by an electric motor 28. The conveyor tube extends from the bottom of bin 22 horizontally in a curve around to a point beneath the fan support and then it extends upward and then across the top of the first filter cell, which is the one nearest to the fan. The bottom of the portion of the conveyor tube crossing the cell is provided with an outlet slot that opens into the top of a rotary inlet valve 29. The valve is a well known type, in which a rotating vaned valve member keeps the passage through the valve sealed but feeds material through the valve casing at a rate dependent upon the speed of the valve member. The bottom of the valve is provided with an outlet slot that opens into a short conduit 31 which empties into the top of the first cell. The conveyor tube extends down the opposite side of the filter housing and then back beneath the first cell, where the top of the tube is provided with an inlet slot that communicates with the outlet of a rotary outlet valve 32 extending entirely across the bottom of the cell.

The conveyor tube then extends up the side of the filter housing and across the top of the middle cell, down beside the housing and across it beneath the middle cell, up the side of the housing and across the top of the last cell, and then down and back around to the outlet of the chip bin 22. The portions of the conveyor tube above the second two cells empty into rotary inlet valves 34 and 35 like valve 29, while the portion of the tube below the middle cell receives from a rotary outlet valve 36 attached to that cell. A similar rotary outlet valve 37 is mounted below the last cell, but it empties into another conveyor that will be described presently. All of the valves are driven continuously, the inlet valves being driven by a motor 38, and the outlet valves by a motor 39.

Filter chips are delivered by the conveyor from supply bin 22 to the top of the first cell, through which they descend. As the chips leave the bottom of the cell they are caught by the same conveyor and delivered to the top of the middle cell. From the bottom of the middle cell the conveyor delivers the chips to the top of the last cell. Any chips which do not pass down through an inlet valve are carried around by the conveyor to the next inlet valve or back around beneath the bin again.

The conveyor into which are delivered the chips from the rotary outlet valve 37 below the last cell is of the same type as the one just described. It includes a continuous tube 41 that extends beneath valve 37 and up to the top of a chute 42, into which the chips are dumped by the conveyor. The chute empties into a charging bin 43. The conveyor then extends downward and back beneath the filter housing and around to the cyclone separators. The conveyor tube extends beneath the outlets of both separators, with which it communicates through rotary valves 44 for receiving the fume particles that are deposited in the separators. From the separators, the conveyor extends back to valve 37 to complete its circuit.

Before the furnace gases reach the cyclone separators, their temperature is reduced hundreds of degrees by water sprayed into conduits 3 from nozzles 46 connected by pipes 47 to a suitable water supply. The nozzles are located at the top of the curves of the conduit, and face away from the furnace so that no water will enter the furnace. The temperature of the gases preferably is reduced by the water from about 2700° to about 350°. This great reduction in temperature causes the volume of the gases to be reduced a great deal so that the fume per cubic foot of gas after cooling is much greater than before cooling. Two important results of cooling the furnace gases are that it permits the fume removing apparatus to be made much smaller, because it has to handle a smaller volume of gas, and to be constructed of ordinary inexpensive materials that do not have to withstand high temperatures.

Heretofore, there generally has been a positive pressure in the furnace, which forces hot gases out the doors and out around the electrodes, thereby causing rapid deterioration of the door openings and the holes for the electrodes as well as of the electrodes themselves. One of the features of this invention is the maintenance of atmospheric pressure or a slight negative pressure in the furnace to avoid the disadvantages just mentioned. However, the suction should not be great enough to draw off gases that normally would stay in the furnace. This desirable result is obtained by placing a damper 50 at the outlet side of exhaust fan 13, such as in conduit 17, and operating it by an electric motor 51 that is controlled through wires 52 by a conventional control device 53 responsive to the pressure inside the furnace. The control device keeps the damper open just far enough for the fan to maintain the inside of the furnace under atmospheric pressure or the desired subatmospheric pressure.

During the melting cycle there is a period when considerably more fume is produced than at other times. Therefore, during this more concentrated period of the cycle, it is important to feed the filter chips through the cells of the filter housing more rapidly because more fume is being delivered to the housing than normally. The rate of chip feed is controlled by the pressure drop across the filter, which it is desired to maintain nearly constant. If the pressure drop starts to increase, it shows that the filter is becoming clogged with fume and that the chips should be renewed more rapidly. The pressure drop is measured by conventional pressure-responsive controls 55 and 56 extending into opposite ends of the filter housing. They are electrically connected by wires 57 and 58 with the motors 38 and 39 that drive the rotary valves above and below the filter cells, so that the valves are made to operate more rapidly when the pressure drop tends to increase, and more slowly when it starts to decrease. The operation of the upper valve of each cell relative to its lower valve is such that the cell is kept not quite full of chips so that they will not pack too tightly in it.

In operation of this apparatus the gases drawn off from the furnace through conduits 3 by means of the exhaust fan first are cooled by the water sprays and thereby reduced in volume, and then they enter the cyclone separators 7 where the larger particles are removed from them by centrifugal force, as is characteristic of such separators. The partially cleaned gases then pass through filter housing 11 where the dirtiest gases first pass through the dirtiest filter bed in the last cell and finally the cleanest gases pass through the cleanest filter bed in the first cell. The gases, from which substantially all the fume has then been removed, then pass through the fan and out of stack 18. While the gases are being filtered, the particles settling in the separators and the dirty chips from the last cell of the filter are continually being carried away by conveyor 41 up to chute 42 and dumped into the charging bin 43. This material, consisting of metal chips and the fume separated from the furnace gases, is then used as needed as part of the furnace charge. The fume consists mainly of iron oxide and calcium oxide which, together with the chips, are valuable additions to a furnace charge. In this way the dirty filter material is disposed of conveniently and without waste, and the separated fume also is disposed of by recovering it in the furnace. At the same time, the furnace gases are cleaned of their objectionable elements.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for removing fume from gases produced in an electric melting furnace, comprising a filter housing, conduit means for conducting said gases from the furnace to said housing, means for flowing the gases in a general horizontal direction through the housing, said housing being provided with a plurality of laterally spaced substantially vertical chambers having perforated side walls extending across the path of said gases, means for delivering filtering material to the top of the chamber farthest from said conduit means to form a downwardly moving filter bed therein, mechanical conveying means for feeding said material to the top of each succeeding chamber from the bottom of the preceding chamber, and means for conducting dirty filtering material away from the bottom of the chamber nearest said conduit means.

2. Apparatus for removing fume from gases produced in an electric melting furnace, comprising a filter housing, conduit means for conducting said gases from the furnace to said housing, means in said conduit means for cooling the gases to reduce their volume, means for flowing the cooled gases in a general horizontal direction through the housing, said housing being provided with a plurality of laterally spaced substantially vertical chambers having perforated side walls extending across the path of said gases, means for delivering filtering material to the top of the chamber farthest from said conduit means to form a downwardly moving filter bed therein, mechanical conveying means for feeding said material to the top of each succeeding chamber from the bottom of the preceding chamber, and means for conducting dirty filtering material away from the bottom of the chamber nearest said conduit means.

3. Apparatus for removing fume from gases produced in an electric melting furnace, comprising a conduit for conducting said gases away from the furnace, said conduit having an upwardly arched portion, a spray nozzle extending through the wall of the conduit near the top of the arch for spraying water into the conduit at the side of the arch farthest from the furnace, a filter housing communicating with the outlet of said conduit, means for flowing the gases in a general horizontal direction through the housing, said housing being provided with a plurality of laterally spaced substantially vertical chambers having perforated side walls extending across the path of said gases, means for delivering filtering material to the top of the chamber farthest from said conduit to form a downwardly moving filter bed therein, means for feeding said material to the top of each succeeding chamber from the bottom of the preceding chamber, and means for conducting dirty filtering material away from the bottom of the chamber nearest said conduit.

4. Apparatus for removing fume from gases produced in an electric melting furnace, comprising a filter housing, conduit means for conducting said gases from the furnace to said housing, means for flowing the gases in a general horizontal direction through the housing, said housing being provided with a plurality of laterally spaced substantially vertical chambers having perforated side walls extending across the path of said gases, each of said chambers having top and bottom openings, means for feeding filtering material periodically into the top of the chamber farthest from said conduit means to form a filter bed therein, mechanical conveying means for feeding to the top of each succeeding chamber filtering material withdrawn periodically from the bottom of the preceding chamber, and means for periodically withdrawing dirty filtering material from the bottom of the chamber nearest said conduit means, said feeding and withdrawing means including means for maintaining the top and bottom openings of the chambers closed except when said material is being fed to or removed from them.

5. Apparatus for removing fume from gases produced in an electric melting furnace, comprising a filter housing, conduit means for conducting said gases from the furnace to said housing, means for flowing the gases in a general horizontal direction through the housing, said housing being provided with a plurality of laterally spaced substantially vertical chambers having perforated side walls extending across the path of said gases, a rotary outlet valve at the lower end of each chamber, means for rotating said valves continuously, means for delivering filtering material to the top of the chamber farthest from said conduit means to form a downwardly moving filter bed therein, a conveyor conduit connecting the top of each succeeding chamber with the valve at the bottom of the preceding chamber, and a conduit for conducting dirty filtering material away from the valve at the bottom of the chamber nearest said conduit means.

6. Apparatus for removing fume from gases produced in an electric melting furnace, comprising a filter housing, conduit means for conducting said gases from the furnace to said housing, means for flowing the gases in a general horizontal direction through the housing, said housing being provided with a plurality of laterally spaced substantially vertical chambers having perforated side walls extending across the path of said gases, a conduit for conducting said gases away from the housing, a damper in said conduit, means responsive to the pressure inside the furnace and operatively connected to said damper for actuating it to maintain a predetermined pressure inside the furnace, means for delivering filtering material to the top of the chamber farthest from said conduit means to form a downwardly moving filter bed therein, means for feeding said material to the top of each succeeding chamber from the bottom of the preceding chamber, and means for conducting dirty filtering material away from the bottom of the chamber nearest said conduit means.

7. Apparatus for removing fume from gases produced in an electric melting furnace, comprising a filter housing, conduit means for conducting said gases from the furnace to said housing, means for flowing the gases in a general horizontal direction through the housing, said housing being provided with a plurality of laterally spaced substantially vertical chambers having perforated side walls extending across the path of said gases, means for feeding filtering material periodically into the top of the chamber farthest from said conduit means to form a filter bed therein, means for varying the rate of operation of said feeding means, means responsive to the pressure drop of the gases flowing through said housing and operatively connected with said rate-varying means to keep said pressure drop substantially constant, means for feeding to the top of each succeeding chamber filtering material withdrawn periodically from the bottom of the preceding chamber, and means for periodically withdrawing dirty filtering material from the bottom of the chamber nearest said conduit means.

8. Apparatus for removing fume from gases produced in an electric melting furnace, comprising a filter housing, conduit means for conducting said gases from the furnace to said housing, means for flowing the gases in a general horizontal direction through the housing, said housing being provided with a plurality of laterally spaced substantially vertical chambers having perforated side walls extending across the path of said gases, a continuous conveyor for delivering filtering material to the top of the chamber farthest from said conduit means and then receiving it from the bottom of that chamber and feeding it to the top of the next chamber, and means for releasing dirty filtering material from the bottom of the chamber nearest said conduit means.

9. Apparatus for removing fume from gases produced in an electric melting furnace, comprising a filter housing, conduit means for conducting said gases from the furnace to said housing, means for flowing the gases in a general horizontal direction through the housing, said housing being provided with a substantially vertical chamber having perforated side walls extending across the path of said gases, a conduit for conducting said gases away from the housing, a damper in said conduit, means responsive to the pressure inside the furnace and operatively connected to said damper for actuating it to maintain a predetermined pressure inside the furnace, means for delivering filtering material to the top of said chamber to form a downwardly moving filter bed therein, and means for conducting dirty filtering material away from the bottom of said chamber.

10. Apparatus for removing fume from gases produced in an electric melting furnace, comprising a filter housing, conduit means for conducting said gases from the furnace to said housing, means for flowing the gases in a general horizontal direction through the housing, said housing being provided with a substantially vertical chamber having perforated side walls extending across the path of said gases, means for feeding filtering material periodically into the top of the chamber to form a filter bed therein, means for varying the rate of operation of said feeding means, means responsive to the pressure drop of the gases flowing through said housing and operatively connected with said rate-varying means to keep said pressure drop substantially constant, and means for periodically withdrawing dirty filtering material from the bottom of said chamber.

11. Apparatus of the class described comprising an electric melting furnace provided with a cylindrical side wall and a roof, the side wall being provided with a charging door and a pouring spout disposed at diametrically opposite sides of the furnace, said roof being provided with a pair of openings therethrough nearer its edge than its center, said openings being spaced about 45° from opposite sides of a radial line perpendicular to a line passing through the centers of said roof and door and spout, a pair of conduits extending into said openings for conducting gases away from the inside of the furnace, a filter housing, means for conducting said gases from said conduits to said housing, means for flowing the gases in a general horizontal direction through the housing, said housing being provided with a plurality of laterally spaced substantially vertical chambers having perforated side walls extending across the path of said gases, means for delivering filtering material to the top of the chamber farthest from said conduits to form a downwardly moving filter bed therein, mechanical conveying means for feeding said material to the top of each succeeding chamber from the bottom of the preceding chamber, and means for conducting dirty filtering material away from the bottom of the chamber nearest said conduit means.

References Cited in the file of this patent

UNITED STATES PATENTS

| Number | Name | Date |
|---|---|---|
| 1,508,331 | Huber | Sept. 9, 1924 |
| 1,895,601 | Beuthner | Jan. 31, 1933 |
| 1,961,956 | Bleibtreu et al. | June 5, 1934 |
| 2,270,903 | Rudbach | Jan. 27, 1942 |

FOREIGN PATENTS

| Number | Country | Date |
|---|---|---|
| 450,912 | Germany | Oct. 17, 1927 |
| 543,747 | France | June 9, 1922 |